US008928956B2

(12) United States Patent
Iwamatsu et al.

(10) Patent No.: US 8,928,956 B2
(45) Date of Patent: Jan. 6, 2015

(54) ILLUMINATION SYSTEM, IMAGE READER AND IMAGE FORMING DEVICE

(71) Applicants: Akihiro Iwamatsu, Zama (JP); Mitsuru Nakajima, Atsugi (JP); Tetsuya Ogata, Machida (JP); Tsuyoshi Fujimoto, Isehara (JP); Tokiko Inoue, Setagaya-ku (JP); Chihiro Tanaka, Naka-gun (JP)

(72) Inventors: Akihiro Iwamatsu, Zama (JP); Mitsuru Nakajima, Atsugi (JP); Tetsuya Ogata, Machida (JP); Tsuyoshi Fujimoto, Isehara (JP); Tokiko Inoue, Setagaya-ku (JP); Chihiro Tanaka, Naka-gun (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/775,852

(22) Filed: Feb. 25, 2013

(65) Prior Publication Data
US 2013/0222865 A1    Aug. 29, 2013

(30) Foreign Application Priority Data

Feb. 24, 2012  (JP) ................................ 2012-038909
Nov. 12, 2012  (JP) ................................ 2012-248635

(51) Int. Cl.
*H04N 1/04*     (2006.01)
*F21V 8/00*     (2006.01)

(52) U.S. Cl.
CPC .................... *G02B 6/0051* (2013.01)
USPC ............ 358/475; 358/484; 358/474; 358/498

(58) Field of Classification Search
USPC .......................... 358/475, 484, 474, 498, 497
See application file for complete search history.

(56) References Cited

U.S. PATENT DOCUMENTS 5,914,760 A * 6/1999 Daiku .............................. 349/65
5,956,106 A    9/1999 Petersen et al.
6,469,755 B1 * 10/2002 Adachi et al. .................. 349/62
6,601,984 B2 * 8/2003 Yamamoto et al. ............ 362/600
7,253,954 B2 * 8/2007 Peterson et al. ............... 359/457
7,700,199 B2    4/2010 Wang et al.
8,264,750 B2    9/2012 Takeuchi
8,488,216 B2 * 7/2013 Sakamoto et al. ............ 358/475
8,559,072 B2 * 10/2013 Takeuchi ....................... 358/475
2005/0248959 A1 * 11/2005 Chiou ........................... 362/602
2009/0323139 A1 * 12/2009 Itoh et al. ...................... 358/474
2010/0027079 A1 * 2/2010 Nishina et al. ................ 358/474
2011/0234803 A1    9/2011 Nakajima et al.
2011/0298925 A1    12/2011 Inoue et al.

FOREIGN PATENT DOCUMENTS

| JP | 3413519 | 4/2003 |
|----|---------|--------|
| JP | 2007-005860 | 1/2007 |
| JP | 4206443 | 10/2008 |
| JP | 2010-213039 | 9/2010 |
| JP | 2011-114762 | 6/2011 |

OTHER PUBLICATIONS

U.S. Appl. No. 13/687,665, filed Nov. 28, 2012, Iwamatsu, et al.

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An illumination system includes a light source unit including light emitting elements arranged in array in a main scan direction to project light beams radially, and an optical guide of a long length made from a translucent material to guide incident beams from an exit surface of the light source unit in a certain direction for output, and including at least one surface with a diffuse structure to diffuse a transmitted beam or a reflected beam among the incident beams, wherein the diffuse structure is configured to diffuse the beam at a center at a larger divergence angle than at ends in the main scan direction.

10 Claims, 13 Drawing Sheets

ILLUMINATION SYSTEM, IMAGE READER AND IMAGE FORMING DEVICE

CROSS-REFERENCE TO RELATED APPLICATION

The present application is based on and claims priority to Japanese Patent Application No. 2012-038909 filed on Feb. 24, 2012 and Japanese Patent Application No. 2012-248635 filed on Nov. 12, 2012 to the Japan Patent Office, the disclosure of which is hereby incorporated by reference in its entirety.

BACKGROUND OF THE INVENTION

1. Field of the Invention

The present invention relates to an illumination system to project a light beam on a document surface, an image reader including the illumination system, and an image forming device including the image reader such as a copier, printer, facsimile machine, plotter, and a complex machine thereof.

2. Description of the Related Art

In related art an image scanner includes a light source to project a light beam to a document surface on a contact glass, and an imaging lens to collect a reflected light from the document surface travelling on the optical axis, and an image sensor or CCD (charge coupled device) to form an image. A light source of such an image scanner is a rod-like light source as a fluorescent lamp or xenon lamp, or a point light source such as LED. The LED is mostly used in place of a xenon lamp for the purpose of increasing a rising speed, elongating a life span, and saving power.

Figure 12:
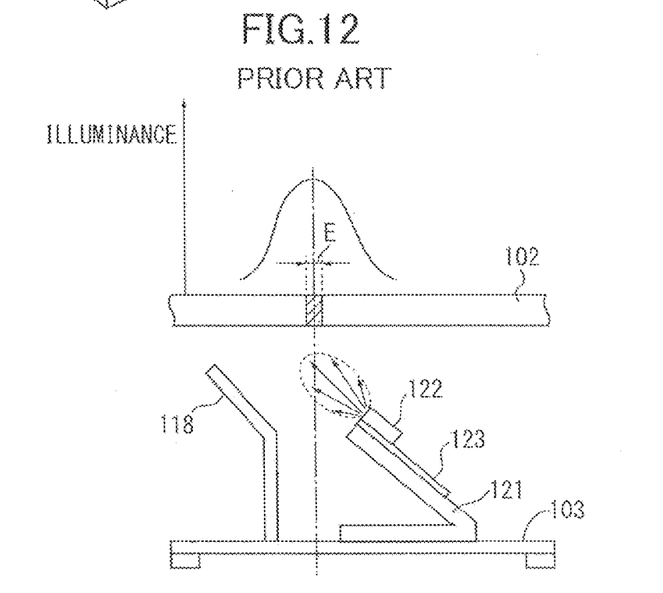
FIG. 12 shows the illumination system of a related art image reader.

FIG. 12 shows the structure of an illumination system of a related art image scanner using an LED. It includes a first scan unit 103 with a bracket 121 with a V-shape cross section on which an LED circuit board 123 is mounted to drive an LED 122. A reflector 118 is attached to the first scan unit 103 to reflect the light beam from the LED 122 with a good illuminance distribution and eliminate a shadow when scanning a document including a cut-and-paste portion.

This image scanner using a reduced optical system faces a problem that the light beam from the light source is largely attenuated in a long distance from the document surface to the CCD. Accordingly, the LED of the image scanner needs to be improved in illuminance. The light amount of a single LED is small and an illumination area is narrow. In view of this, multiple LEDs 122 are arranged in main scan direction to increase the illuminance on a document surface.

With the LEDs 122 in array, to achieve a good illuminance distribution on the document surface in sub scan direction, the LED array is preferably inclined by the bracket 121 to oppose the document surface. Further, the illuminance distribution on the document surface in the sub scan direction is preferably such that only an area E or an actual scan area is illuminated with the light beam. However, even using an inclined LED array, it is known that the areas other than the scan area E are illuminated with the light beam reflected by the reflector 118. This causes a problem in scanning an image including a small black portion placed between white portions, for example, that the reflected beam by the white portions enters the image sensor, increasing the output value of the black portion. Because of this, the black portion cannot be accurately reproduced.

To solve this problem, Japanese Patent Application Publication No. 2007-5860 (Reference 1) discloses an illumination unit which includes, on the exit surface of the LED array, an optical guide extending in the main scan direction to guide the light beam from the LED array to a scan area, in order to illuminate the scan area with even illuminance distribution, for example. Further, by adjusting the interval of the LED arrangement, an arbitrary illuminance distribution in the main scan direction can be achieved. Using this, a convergent element as a lens or lens unit to converge or image a reflected light from the document on the CCD is disposed so that the optical axis thereof coincides with the center of the optical guide and the arrangement of the LEDs is adjusted so that the closer the position of the LEDs to both ends in the main scan direction, the narrower the interval of the LEDs. Thereby, it is able to correct illuminance falloff of a convergent element by cosine fourth law effectively.

Furthermore, Japanese Patent Application Publication No. 2010-213039 (Reference 2) discloses an illumination unit including on the exit surface of an optical guide a diffuse structure with an uneven density to diffuse light to the document surface with a proper illuminance distribution. The diffuse structure is densely formed at the center and scarcely formed at the ends in the main scan direction to substantially reduce transmittance on the diffuse surface and create an illuminance distribution having high end portions.

Japanese Patent Application Publication No. 2011-114762 (Reference 3) discloses another illumination unit incorporating an anisotropic diffuse structure to diffuse beams in not-radially circular shape, for instance. With use of the anisotropic diffuse structure in an image scanner with a long-length image sensor, the amount of light in a long effective scan area in sub scan direction can be reduced, improving the efficiency of the illumination unit.

However, in correcting the cosine fourth law of a convergent element by changing the LED interval, there is a limit to the mounting interval of the LEDs at the ends. Therefore, the maximal number of LEDs mounted on the circuit board is determined by the angle of view of the convergent element and the interval limit of the LEDs. Especially, by use of a convergent element with a short focal point and a wide angle of view, the illuminance on an image sensor having passed through the convergent element is greatly reduced from the center to the ends in the main scan direction.

Figure 13:
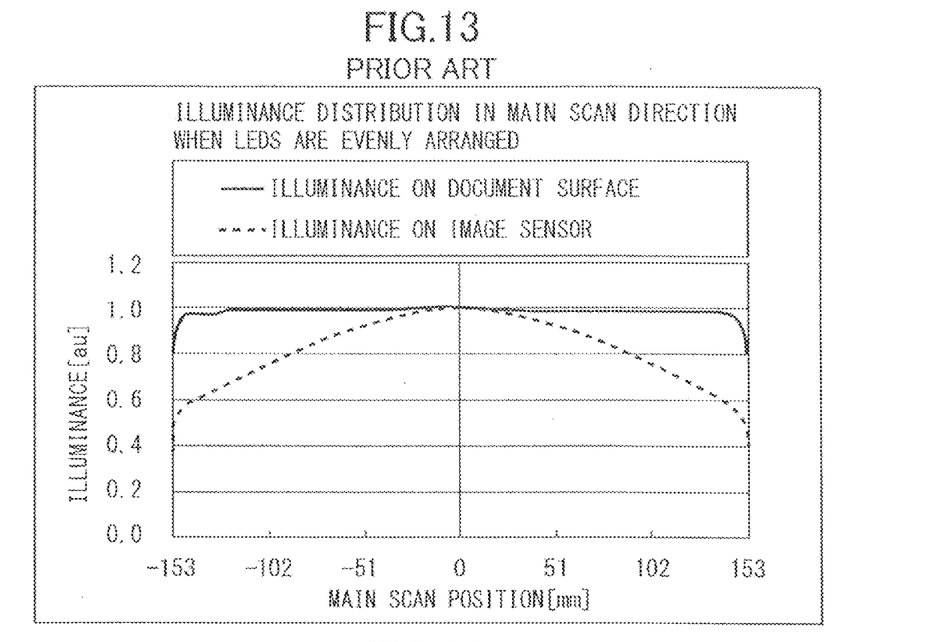
FIG. 13 is a graph showing an illuminance distribution in the main scan direction to show an influence of the luminance falloff of a convergent element by cosine fourth law when LEDs are evenly arranged.
Figure 14:
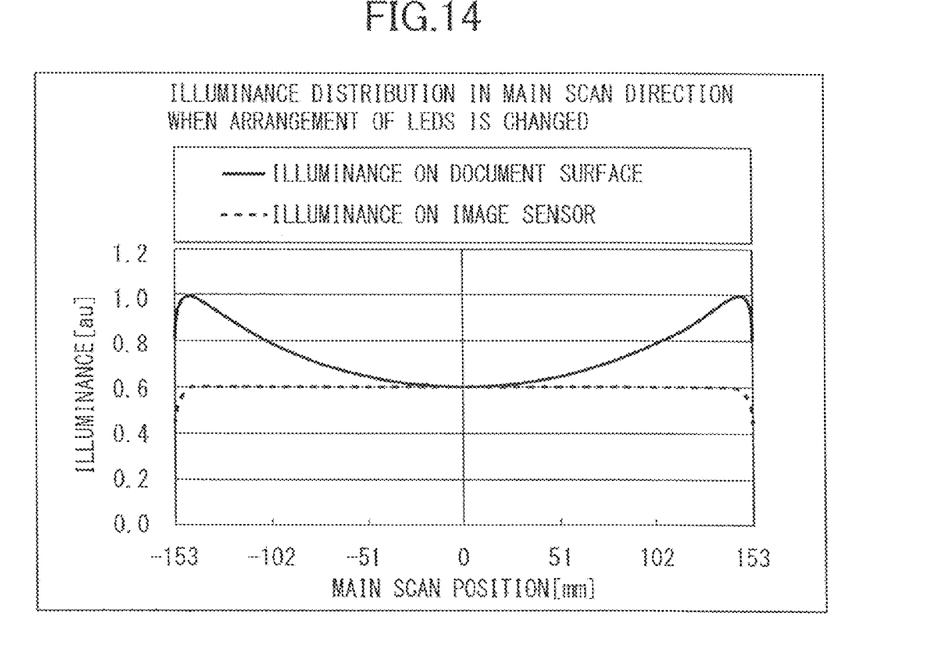
FIG. 14 is a graph showing an illuminance distribution in the main scan direction when illuminance falloff due to the convergent element is corrected by changing the arrangement of the LEDs.

FIG. 13 shows a relation between the illuminance on the document surface and that on the image sensor when the LEDs are arranged with equal interval in the main scan direction. The reflection rate of the document is set to 1.0 and illuminance falloff by the convergent element includes the decrease by cosine fourth law for simplicity. It is seen from the drawing that the illuminance on the image sensor is greatly reduced towards the ends. To correct the illuminance on the image sensor, the illuminance distribution needs to increase from the center to the ends of the document in the main scan direction as shown in FIG. 14. However, at a half angle of view of 30°, 1.78 times larger illuminance is required for the ends of the document in comparison with that for the center.

Accordingly, for correcting an illuminance difference on the document by changing the LED interval, it is necessary to set the interval at the center to be 1.78 times larger than at the ends in the main scan direction since the illuminance at some main scan position is approximately inversely proportional to the interval of the LEDs at that position. The illuminance on the image sensor is even at the value of the center of the document if the reflection rate on the document and the transmittance and reflection rate of the convergent element are even. That is, after the cosine fourth law correction, the illuminance on the document becomes even at the lowest value. In a scan system using a convergent element with a short focal point and a wide angle of view, the LEDs are very scarcely arranged at the center in main scan direction so that the larger the angle of view, the smaller the illuminance on the document by the central LEDs after the cosine fourth law correction. Therefore, the illumination unit having the convergent element with a short focal point is not applicable to a high-speed scanner requiring a large amount of light.

In Reference 2 the illuminance distribution on the document surface is created by changing the ratio of diffused beams by the density of the diffuse structure. The transmittance is decreased at the center of the diffuse structure due to a high density but the amount of light illuminating the effective scan area is also decreased, reducing the optical use efficiency. Therefore, the illumination unit cannot deal with high-speed scanning requiring a large amount of light.

In Reference 3, with the LEDs arranged at equal interval, a loss of light in sub scan direction can be reduced, however, the divergence angle in the main scan direction becomes constant and so does the illuminance on the document. Accordingly, the illuminance distribution for the cosine fourth law correction as shown in FIG. 14 cannot be created unless the mounting interval of the LEDs is changed or the number thereof is reduced. This illuminance unit cannot deal with high-speed scanning requiring a large amount of light either.

SUMMARY OF THE INVENTION

The present invention aims to provide an illumination system which can deal with high-speed scanning with an improved optical use efficiency and reduced power consumption without a special element and is applicable to a variety of image scanners and image forming devices.

According to one aspect, an illumination system includes a light source unit including light emitting elements arranged in array in a main scan direction to project light beams radially and an optical guide of a long length made from a translucent material to guide incident beams from an exit surface of the light source unit in a certain direction for output, and including at least one surface with a diffuse structure to diffuse a transmitted beam or a reflected beam among the incident beams, wherein the diffuse structure is configured to diffuse the beam at a center at a larger divergence angle than at ends in the main scan direction.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

First Embodiment

A first embodiment is described with reference to FIGS. 1 to 7. First, the structure and operation of a color copier as an image forming device is described referring to FIG. 7 by way of example. The color copier 10 includes an automatic document feeder 11, a paper feed unit 12, an image reader 13, and an image forming unit 14.

Figure 7:
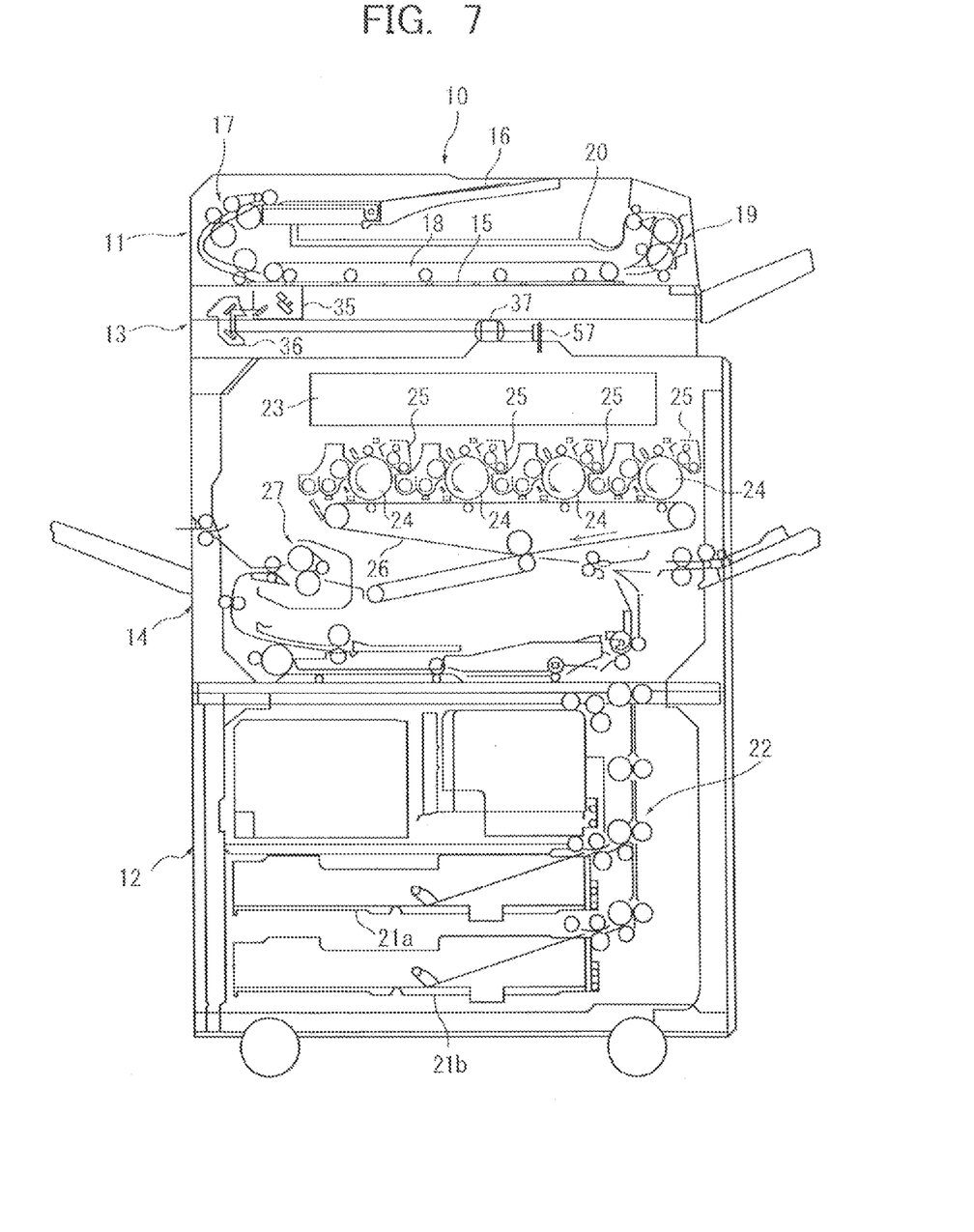
FIG. 7 schematically shows the structure of an image forming device.

The automatic document feeder 11 includes a paper separating element 17 having a feed roller and a separation roller to carry a document from a paper tray 16 to a contact glass 17, a carrier belt 18 to carry the read document, and a discharge element 19 including discharge rollers to discharge the document to a paper discharge tray 20. To read both sides of a document, the document is returned to the contact glass 15 by a branch mechanism of the discharge element 19 and the carrier belt 18 to read an unread side.

The paper feed unit 12 includes paper cassette 21a, 21b containing different sizes of sheets of paper and feed rollers 22 to carry the sheets of paper from the paper cassettes 21a, 21b to transfer positions. The image reader 13 includes a first carriage 35 and a second carriage 36 to drive in horizontal direction in the drawing as sub scan direction and project a light beam to a document surface to scan the document. The light reflected by the document is reflected by a mirror and converged by a lens unit 37 as convergent element to enter an image sensor as CCD or light receiving element.

The image forming unit 14 includes an exposure unit 23 to generate write signals on the basis of read signals captured by the lens unit 37, four photoreceptor drums 24 on which latent images are formed according to the write signals generated by the exposure unit 23, and develop units 25 containing cyan, magenta, yellow, black toners to supply the toners to the photoreceptor drums 24, respectively and visualize the latent images. The visualized images on the photoreceptor drums 24 are superimposed and transferred to generate a color image. The image forming unit 14 further includes a transfer belt 26 to transfer the color image onto a sheet of paper fed from the paper feed unit 12, and a fuse unit 27 to fuse the color image on the sheet of paper.

Next, the structure of the image reader 13 is described in detail referring to FIGS. 1 to 5. The image reader is applicable to an image scanner, a copier and a facsimile machine including an image forming device as a complex machine with copy and facsimile functions.

Figure 1:
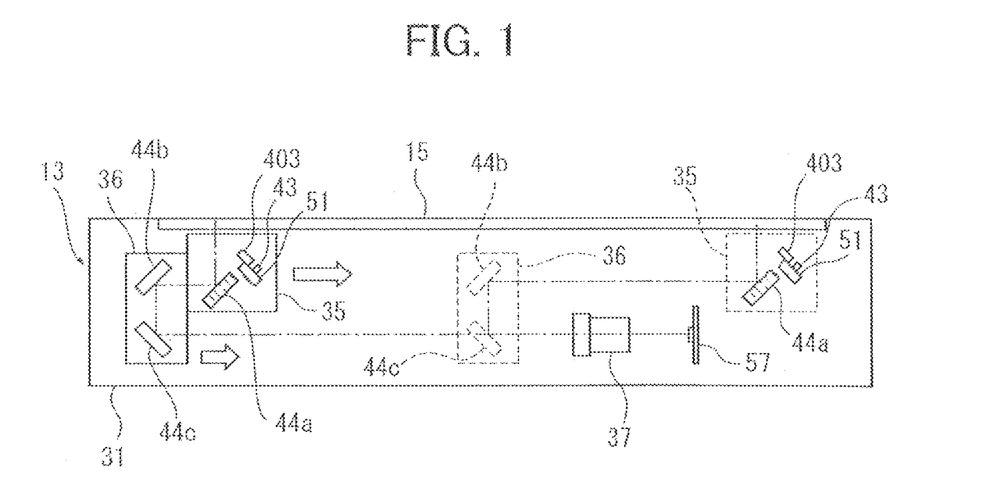
FIG. 1 is a schematic side view of an image reader according to a first embodiment.
Figure 2A:
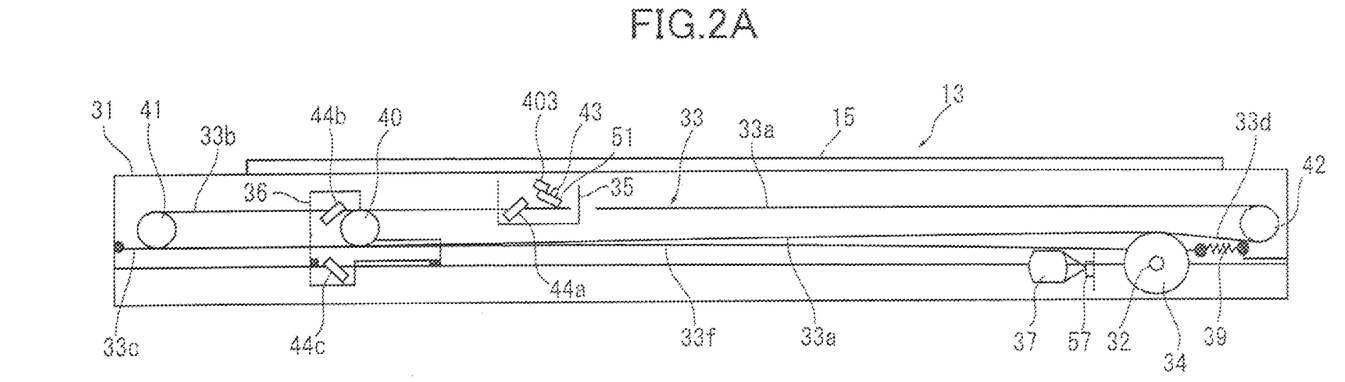
FIGS. 2A, 2B show the driving structure of a carriage of the image reader.
Figure 2B:
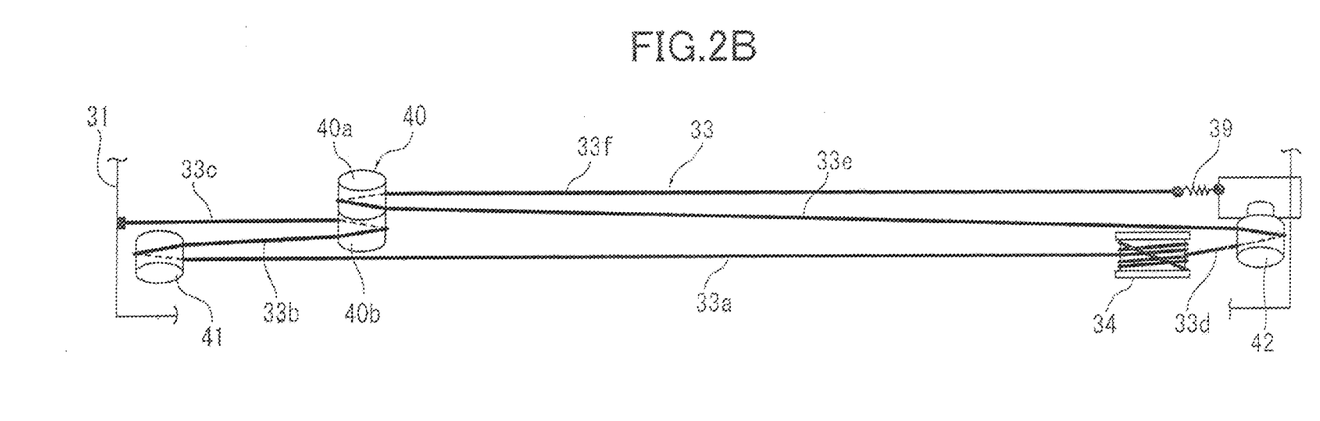

FIG. 1 is a side view of the image reader 13, showing the positions of parts and elements. FIGS. 2A, 2B show a relation between pulleys and drive wires 33 of the second carriage 36. FIG. 2A is a side view and FIG. 2B shows the connection of the drive wires 33 seen from the top. The image reader 13 includes a body frame 31, a drive shaft 32, drive wires 33, wire drive pulleys 34, and the first and second carriages 35, 36. It also includes the lens unit 37, a tension spring 39, a carriage pulley 40, idler pulleys 41, 42, and an image sensor 57.

Although not shown, first and second rails are provided in the body frame 31. The first carriage 35 is slidably attached on the first rail while the second carriage 36 is slidably attached on the second rail. The drive shaft 32 is connected to a not-shown motor and the wire drive pulleys 34 around which the drive wires 33 are wrapped are attached to both ends thereof. The drive wires 33 extend in horizontal direction in FIGS. 2A, 2B. Two drive wires 33 are used for driving the first and second carriages 35, 36 although only the one for the second carriage 36 is shown in the drawings.

The drive wires 33 and idler pulleys 41, 42 having the same structure and function are provided in front of and behind the body frame 31, however, only the idler pulley and drive wire on one side are described. In the present embodiment four pairs of drive wires 33 and idler pulleys 41, 42 are provided at the four corners of the body frame 31. The carriage pulley 40 is provided in the second carriage 36 and the drive wires 33 extend via the carriage pulley 40 and idler pulleys 41, 42.

Figure 3:
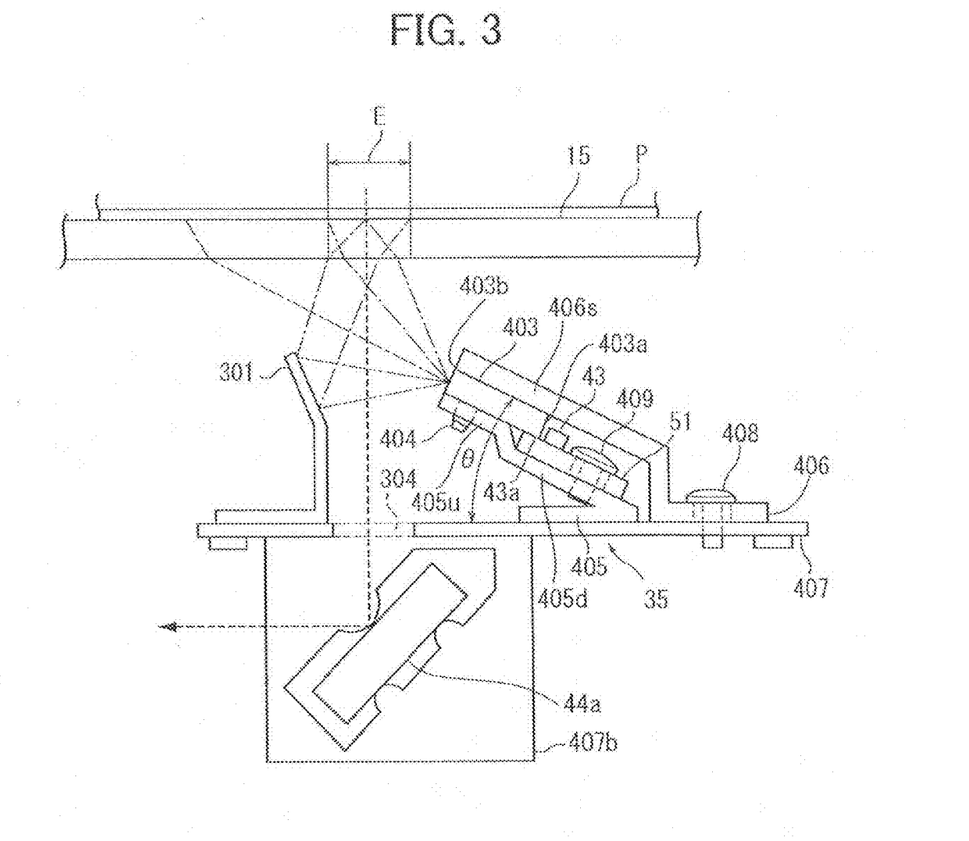
FIG. 3 is a side view of the structure of an illumination system.
Figure 4:
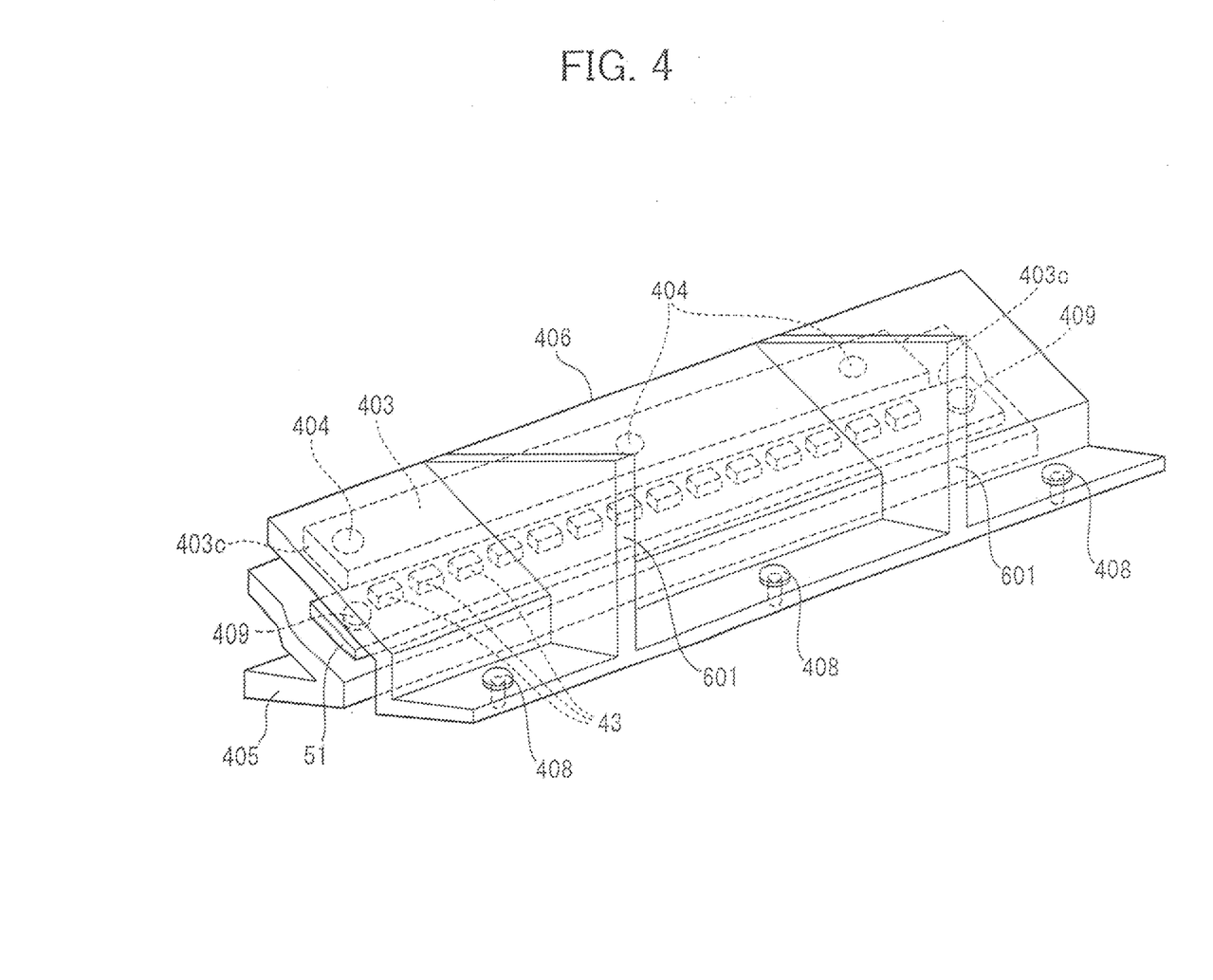
FIG. 4 is a perspective view of the structure of the illumination system.

In FIGS. 3, 4 the first carriage 35 is made of a plate-like base 407 formed by sheet metal processing and a pair of side plates 407b vertically extending downward from the base 407. It includes a first mirror 44a between the side plate pair 407b. FIG. 2A shows only one side plate 407b. A support plate 405 is attached to the base 407 by not-shown screws, made of a metal plate with a good heat radiation and includes a mount for the base 407 and a slope bent to make a certain angle with the base 407.

The slope of the support plate 405 includes an upper step 405u and a lower step 405d approximately in parallel to each other in the sub scan direction. The distance between a cover 406 and the lower step 405d is larger than that between the cover 406 and the upper step 405u. An LED circuit board 51 is mounted on the lower step 405d by a screw 409 and LEDs as a point light source are arranged in array or arrays on the LED circuit board 51 in the main scan direction. The screw 409 is disposed closer to the bent portion of the cover 406 (right side in FIG. 3) to fix both ends of the LED circuit board 51 in the main scan direction.

An optical guide 403 is positioned on the upper step 405u of the support plate 405 to guide an incident beam to a certain direction for output. The optical guide 403 is a cuboid flat in the main scan direction and made from a resin with a high transmittance. It integrally includes three positioning pins 404 or protrusions to insert into not-shown three through holes of the support plate 405. The three positioning pins 404 are formed at three positions, center and both ends, along the length on the bottom surface of the optical guide 403.

Figure 5:
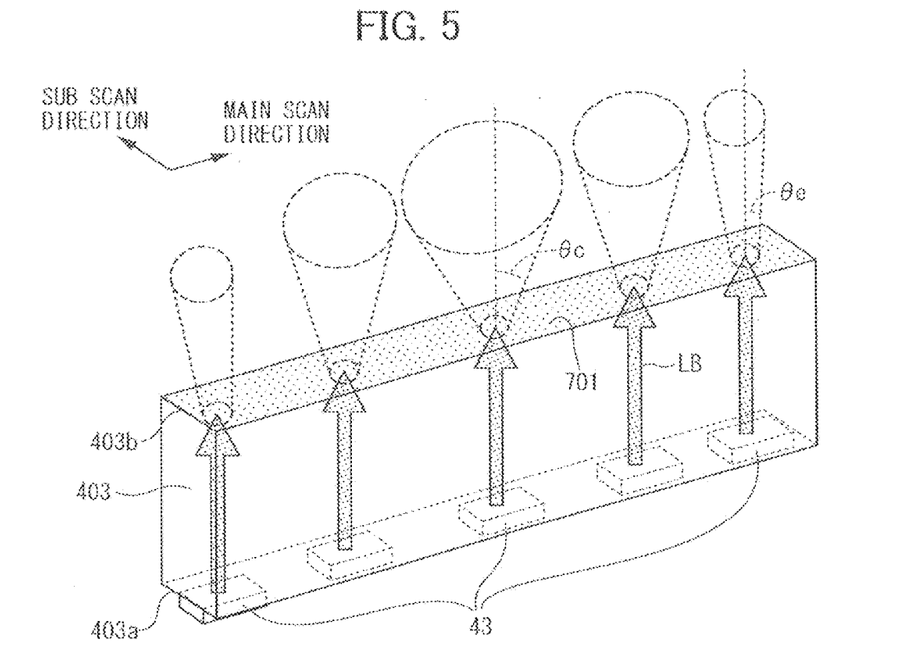
FIG. 5 shows the diffuse function of the illumination system.

As shown in FIG. 5, the optical guide 403 includes a diffuse structure 701 on an exit surface 403b. The diffuse structure 701 is comprised of a micro lens array arranged in the main scan direction in the present embodiment, to diffuse a transmitted beam or a reflected beam among the incident beams.

The LEDs 43 as a light source unit, optical guide 403 and diffuse structure 701 constitute an illumination system.

Light beams LB from the LEDs 43 are incident on the optical guide 403 and reach the exit surface 403b by total reflection in FIG. 3. In the diffuse structure of the optical guide 403 the divergence angle $\theta c$ at the center is larger than that $\theta e$ at the ends in the main scan direction. Thereby, the light beam diffused by the center travels towards both ends of the document and is incident thereon. The light beam passing through the center is also incident on both ends of the document. Thus, on the document the illuminance is higher at both ends than the center.

By forming the diffuse structure 701 so that the divergence angle $\theta$ decreases from the center to both ends of the optical guide 403 in the main scan direction, the illuminance on the document can be increased from the center to both ends. Further, by adjusting the diffuse structure so as to negate a cos 4 illuminance falloff of the convergent element of the image reader, the illuminance on the image sensor through the convergent element becomes even from the center to both ends. In the present embodiment a decrease in the optical use efficiency can be avoided since the main scan center of the diffuse structure is not densely formed unlike in the related art. Thus, the illumination system according to the present embodiment can correct the illuminance falloff by the cosine fourth law only with the diffuse structure of the optical guide.

Figure 6:
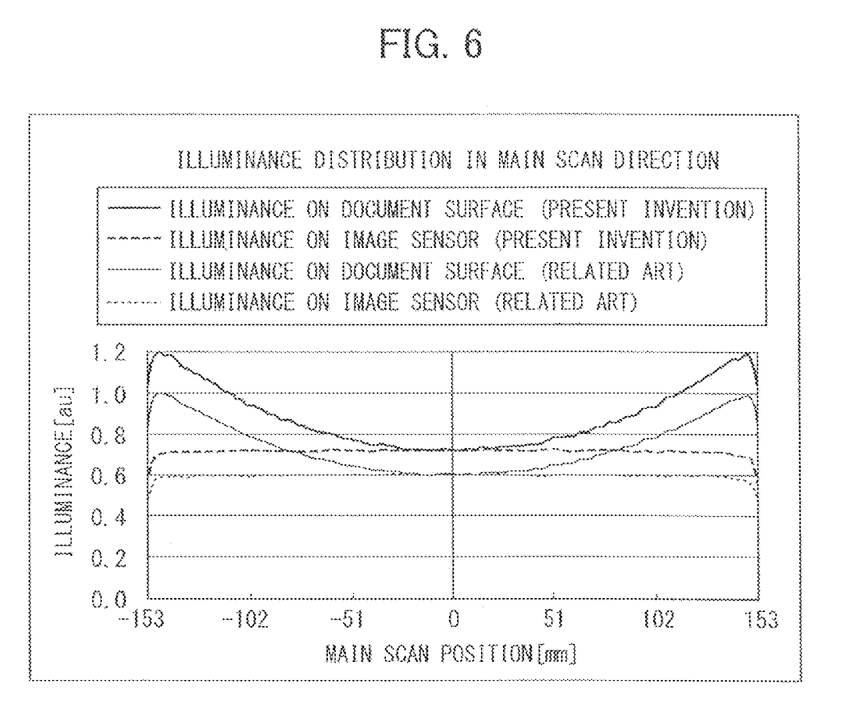
FIG. 6 is a graph showing an illuminance distribution on a document surface in the main scan direction before and after the cos 4 correction by the present invention and a related art.

FIG. 6 is a graph showing the illuminance distribution on the document in the main scan direction before and after the illuminance correction by the image reader 13 according to the present embodiment and by a related art. As seen from the drawing, the illumination system according to the present embodiment can correct the cos 4 illuminance falloff even with use of evenly arranged LEDs on the circuit board. Moreover, it does not need to reduce the transmittance on the diffuse surface so that it can effectively achieve the illuminance distribution in FIG. 14 without impairing the optical use efficiency. In particular, it is very effective when the LEDs are evenly arranged on the circuit board at a limit density, and can exert a higher illuminance than when the illuminance distribution is adjusted by the adjustment of the interval of the LEDs. Thus, it can be applied to a scan system needed to have higher illuminance, for example, for the illumination for a high speed scanner.

Second Embodiment

Figure 8:
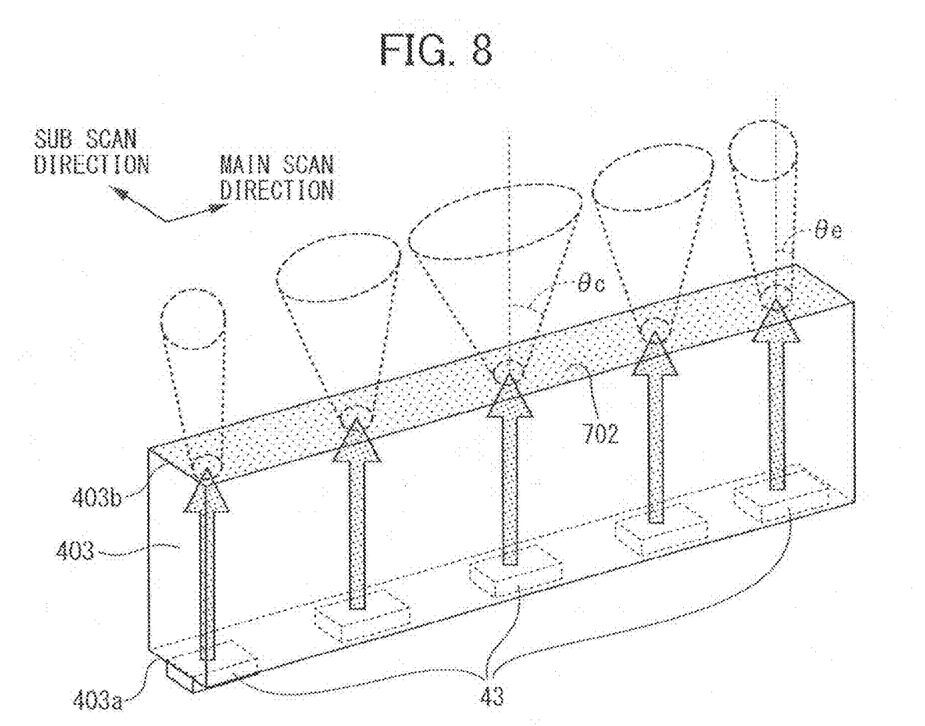
FIG. 8 shows the diffuse function of an illumination system according to a second embodiment.

An illumination system according to the second embodiment is described with reference to FIGS. 8 to 10. A description of the same structure and function as those in the first embodiment is omitted. In the first embodiment the shape of diffused light from the diffuse structure 701 is radially circular so that the divergence angle is changed likewise in both the main and sub scan directions, as shown in FIG. 5. The diffuse structure 701 is thus isotropic. Further, the effective scan area of the image reader 13 is short in the sub scan direction in FIG. 12. There is a problem with the isotropic diffuse structure that at a large divergence angle in the main scan direction, it increases in the sub scan direction accordingly. Thus, the amount of diffuse light outside the effective area in the sub scan direction is also increased. The present embodiment aims to solve such a problem and further improve the optical use efficiency.

It is preferable that the divergence angle be approximately the same in the sub scan direction irrespective of a position in the main scan direction. In FIG. 8 the optical guide 403 includes an anisotropic diffuse structure 702 on the exit surface 403b. The LEDs 43, optical guide 403, and anisotropic diffuse structure 702 constitute the illumination system according to the present embodiment. FIG. 8 shows that the divergence angle changes in the main scan direction but shows almost no change in the sub scan direction. The anisotropic diffuse structure 702 can control the divergence angle in the main and sub scan directions independently so that it can increase the divergence angle in the main scan direction without increasing it in the sub scan direction. Especially, it is possible to reduce the amount of light outside the effective scan area in the sub scan direction from the center of the diffuse structure in the main scan direction with a large divergence angle. Thus, an efficient illumination system can be realized.

One example of the anisotropic diffuse structure 702 is a micro lens array of elliptic micro lenses arranged in the main scan direction. The elliptic micro lenses are arranged in arrays so that their long diameters extend in the sub scan direction and their short diameters extend in the main scan direction. Thereby, it can exert anisotropic diffusion. The divergence angle of this diffuse structure can be changed in the main scan direction by changing the curvature radius, pitch or lens sag of the short diameter of the elliptic micro lens.

Figure 9A:
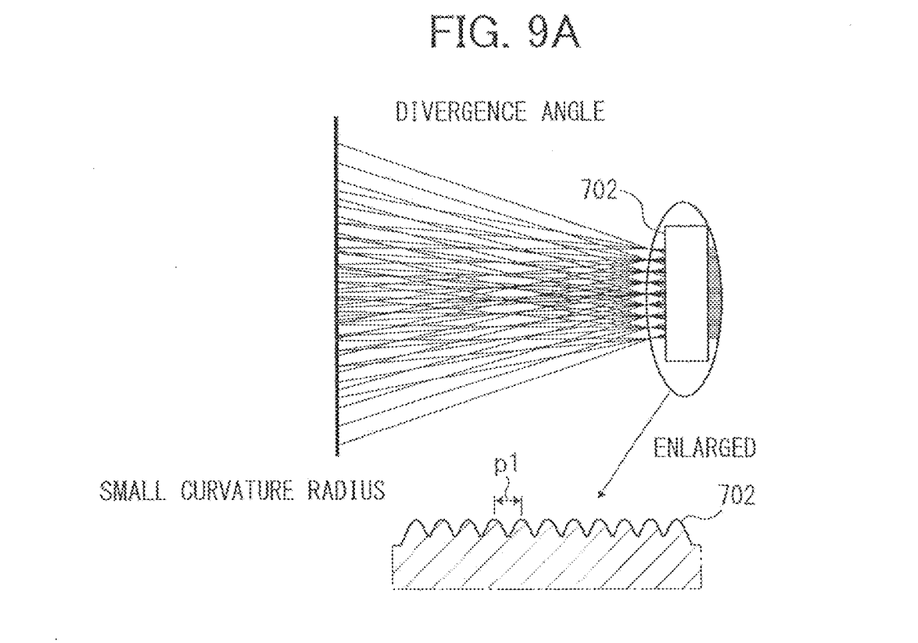
FIG. 9A shows the divergence angle of a micro lens array when a lens sag is constant and the curvature radius and pitch of the micro lens is small and FIG. 9B shows the same when the curvature radius and pitch of the micro lens is large.
Figure 9B:
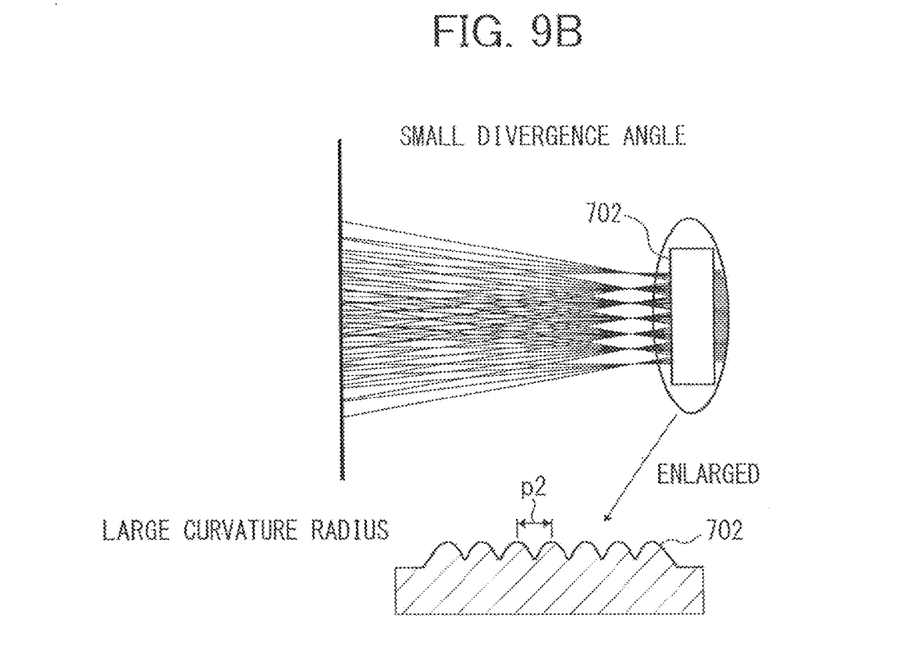

For example, with a fixed lens sag, the smaller the curvature radius and the pitch p, the larger the divergence angle as shown in FIG. 9A. Because of this, the interval of the micro lenses at the ends needs to be wider than at the center since a smaller divergence angle is required at the ends. That is, the micro lenses are densely arranged at the center and sparsely arranged at the ends in the main scan direction.

Figure 10A:
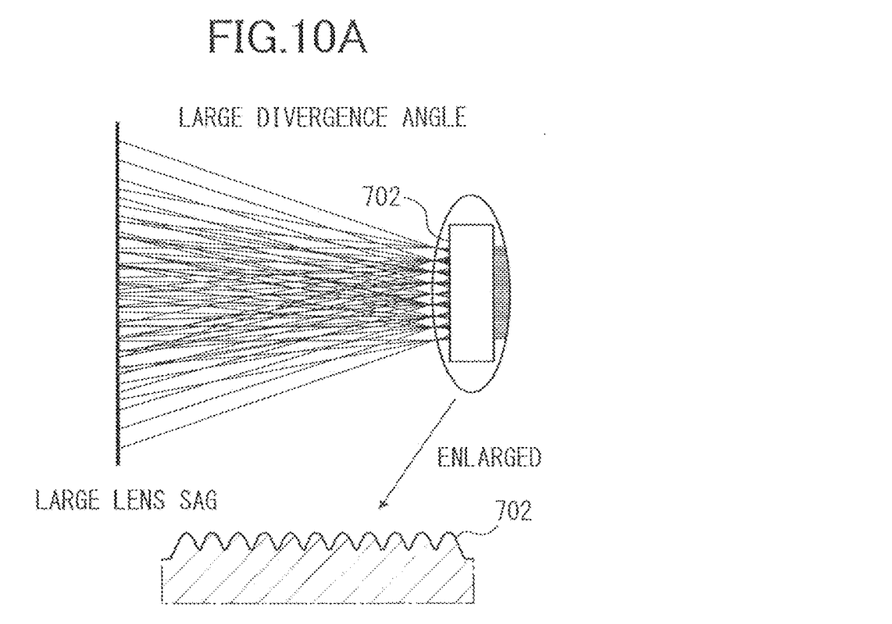
FIG. 10A shows the divergence angle of a micro lens array when a lens sag is large and FIG. 10B shows the same when the lens sag is small.
Figure 10B:
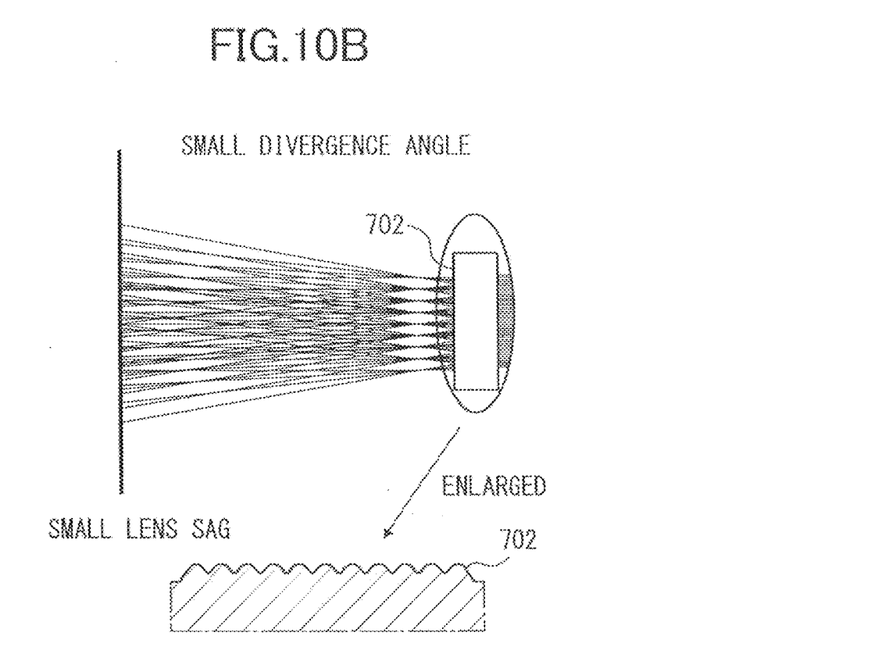

Meanwhile, with a fixed pitch, the curvature radius of the short diameter of the micro lenses at the center is set to be small and that at the ends is set to be larger than that at the center as shown in FIGS. 10A, 10B. Thereby, the divergence angle of the diffuse structure can be changed. With use of an evenly arranged micro lens array, unevenness or moire in diffused light may occur due to optical interference. To negate the interference, the parameters of lens array such as arrangement, position, or size can be randomized to a certain degree while the angular property of diffused light is maintained. This randomizes the phase of transmitted light and prevents the occurrence of interference.

Third Embodiment

The diffuse structure 702 can be formed by changing refractive index in addition to the shape of the micro lenses as above, and it can be given phase modulation using a change in refractive index of a resin material. In the present embodiment the inside of the optical guide is added with a filler made from a translucent material with a different refractive index from that of the optical guide. By the filler, the diffuse structure can attain a random diffuse characteristic. That is, inside the optical guide the filler creates a primary diffusion and the diffuse structure 702 can increase a change in a secondary diffusion based on the primary diffusion. The size of the filler depends on the refractive index of the optical guide or filler. Preferably, it is from about the wavelength of light to about ten times thereof.

The filler can be made from silica, for example. The divergence angle changes in line with the size of the filler and the density in a unit volume of the optical guide. A filler-added optical guide formed by injection molding has almost even density distribution but each particle of the filler is randomly arranged inside the optical guide. Thereby, the light beam diffused by the filler exerts a diffuse characteristic in random phase so that optical interference is unlikely to occur. Therefore, the evenly arranged elliptic micro lenses will not cause a problem. Alternatively, a cylindrical lens array can be used in replace of the elliptic micro lens array.

Figure 11:
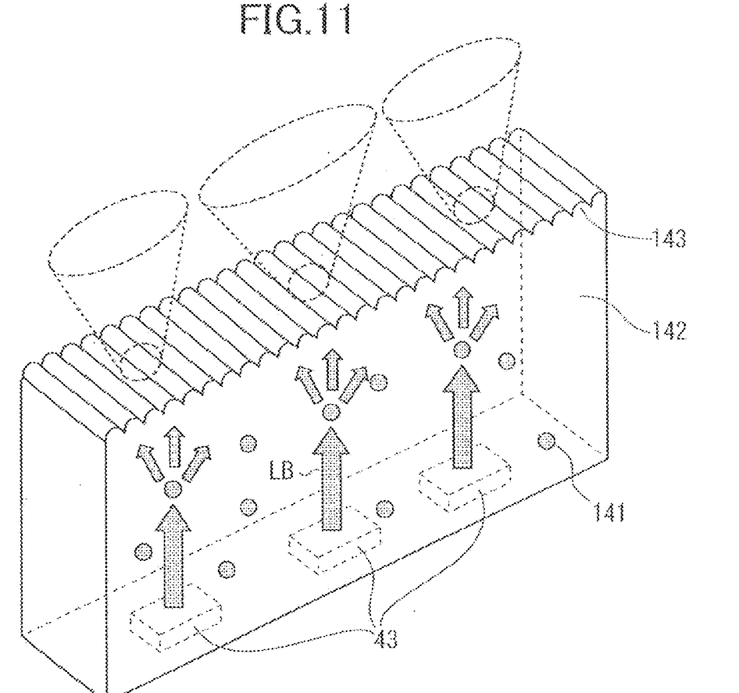
FIG. 11 shows the diffuse function of an illumination system according to a third embodiment.

FIG. 11 shows a change in the divergence angle of an optical guide 142 to which a filler 141 is added, by way of example. The optical guide 142 includes a cylindrical lens array 143 on the exit surface. The divergence angle is changed by changing the parameter of the lens array 143 such as the curvature radius, sag, or pitch. The LEDs 43 as light source unit, optical guide 142, and cylindrical lens array 143 as diffuse structure constitute an illumination system according to the present embodiment.

For a typical example of the anisotropic diffuse structure, an LSD (Light Shaping Diffuser) plate is provided by Luminit, LLC and Asahi Kasei Corporation, as disclosed in Japanese Patent No. 3413519 and No. 4206443. This product includes a random micro lens array to diffuse light. By holography using optical interference exposure, a micro diffuse structure can be created.

Figure 15:
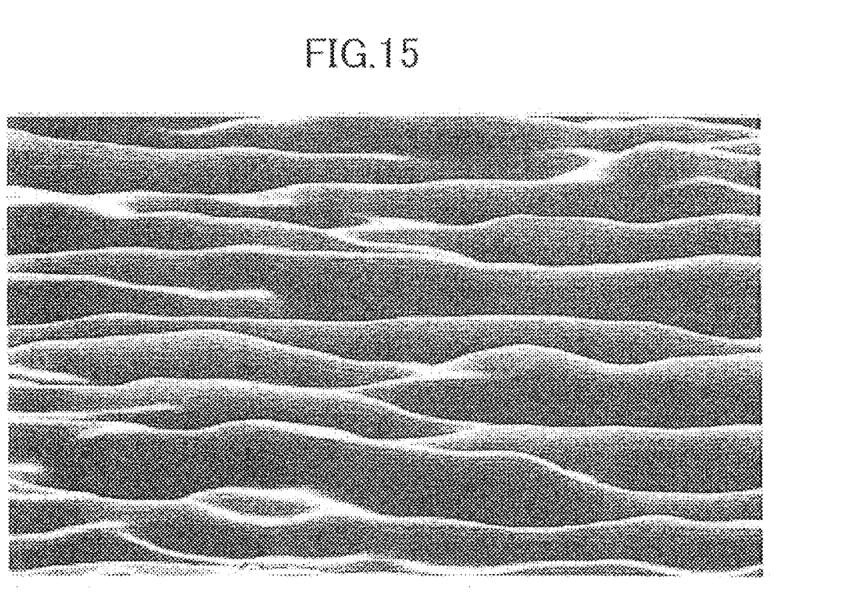
FIG. 15 is an enlarged view of a microstructure surface of an LSD plate as an example of an anisotropic diffuse structure.

FIG. 15 is an enlarged view of the microstructure surface of the LSD plate. As seen from the drawing, each one of lens arrays is randomly arranged and the shapes thereof are all different. Therefore, it is free from a trouble as interference or moire. For example, it is possible to produce an optical guide which changes in divergence angle in the main scan direction by preparing different LSD plates with different divergence angles, attaching plates with a larger divergence angle to the center of the exit surface of the optical guide and attaching plates with smaller divergence angles thereto so that the closer to the ends the position thereof, the smaller the divergence angle.

The above embodiments describe an example where the transparent diffuse structure is provided on the exit surface of the optical guide. Alternatively, it can be on the incidence surface, both of the incidence and exit surfaces, or on any reflective surface of the optical guide. Further, depending on the shape of the optical guide, a reflective diffuse structure can be used. The illumination system according to any one of the embodiments can also correct illuminance falloff caused by vignetting due to the frame of the contact glass.

As described above, according to the above embodiments, the illumination system can project divergent light beams towards the ends of the document in the main scan direction from the center of the diffuse structure, without a reduction in the number of LEDs and the optical use efficiency. Thereby, the amount of light on the ends of the document surface in the main scan direction can be increased. It can correct the illuminance falloff due to the cosine fourth law of the convergent element and achieve a good illuminance distribution. Even with use of the LEDs evenly arranged at a limit density, it can achieve a good illuminance distribution with the illuminance falloff corrected without a reduction in the optical use efficiency.

Accordingly, it is made possible to effectively correct the illuminance falloff at the ends of the effective scan area without a special element and a cost increase and provide an illumination system with higher illuminance. It is applicable to a high-speed scanner requiring high illuminance.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An illumination system comprising:
   a light source unit including at least three light emitting elements arranged in array in a main scan direction to project light beams radially; and
   an optical guide of a length made from a translucent material to guide incident beams from an exit surface of the light source unit in a certain direction for output, and including at least one surface with a diffuse structure to diffuse a transmitted beam or a reflected beam among the incident beams, wherein the diffuse structure is configured to diffuse the beam at a center at a larger divergence angle than at ends in the main scan direction, and the diffuse structure includes elliptic micro lenses arranged so that longer diameters of the micro lenses extend in a same direction.

2. An illumination system according to claim 1, wherein the diffuse structure is an anisotropic diffuse structure to diffuse the transmitted beam or reflected beam of the incident beams in the main scan direction more widely than in a sub scan direction.

3. An illumination system according to claim 2, wherein a divergence angle of the beam from the anisotropic diffuse structure in the sub scan direction is constant from the center to the ends in the main scan direction.

4. An illumination system according to claim 1, wherein the optical guide includes an optical diffuse element with a different refractive index from that of the optical guide.

5. An illumination system according to claim 4, wherein the optical diffuse element is a filler added to the optical guide and made from a translucent material.

6. An illumination system according to claim 1, wherein the diffuse structure is of a random shape.

7. An image reader comprising:

the illumination system according to claim 1, to project light beams to a document;

a convergent element to converge a reflected beam from the document;

a light receiving element to receive the converged beam by the convergent element.

8. An image forming device comprising the image reader according to claim 7.

9. An illumination system according to claim 1, wherein the light source includes five light emitting elements arranged in array.

10. An illumination system comprising:

a light source unit including light emitting elements arranged in array in a main scan direction to project light beams radially; and an optical guide of a length made from a translucent material to guide incident beams from an exit surface of the light source unit in a certain direction for output, and including at least one surface with a diffuse structure to diffuse a transmitted beam or a reflected beam among the incident beams, wherein:

the diffuse structure is configured to diffuse the beam at a center at a larger divergence angle than at ends in the main scan direction, and the diffuse structure includes elliptic micro lenses arranged so that longer diameters of the micro lenses extend in a same direction.

* * * * *